United States Patent [19]
Pokrinchak et al.

[11] 3,738,710
[45] June 12, 1973

[54] ELECTRONIC TRAILER BRAKE ACTUATOR

[75] Inventors: Jordan J. Pokrinchak, Shelton; Charles J. Corris, Bridgeport, both of Conn.

[73] Assignee: Jordan Research Corporation, Shelton, Conn.

[22] Filed: Feb. 25, 1971

[21] Appl. No.: 118,883

[52] U.S. Cl. .................... 303/20, 188/158, 303/7, 340/71
[51] Int. Cl. .............................................. B60t 13/74
[58] Field of Search ................. 340/22, 52, 53, 54, 340/60, 69, 71; 188/3, 156, 158, 163; 303/7, 20; 280/400, 422, 423, 428; 317/141 S, 148.5

[56] References Cited
UNITED STATES PATENTS

| | | | |
|---|---|---|---|
| 3,046,470 | 7/1962 | Blocher | 317/148.5 R X |
| 3,141,530 | 7/1964 | Morley | 188/163 |
| 3,371,253 | 2/1968 | Hubbard | 188/158 X |
| 3,503,652 | 3/1970 | Vanden Broek | 303/3 |
| 3,538,392 | 11/1970 | Carmichael et al. | 317/148.5 R |
| 3,574,414 | 4/1971 | Jacob | 303/7 |

*Primary Examiner*—John W. Caldwell
*Assistant Examiner*—Kenneth N. Leimer
*Attorney*—St. Onge, Mayers & Reens

[57] ABSTRACT

A trailer brake actuator is normally signaled into operation upon energization of the brake light circuit in the towing vehicle. Closure of the brake light switch supplies charging current to a capacitor, and the increasing voltage developed thereacross is amplified and used to control the conductance of a series current regulator connected in an energizing circuit for the trailer brakes. A separate switch permits more rapid charging of the capacitor and actuation of the trailer brakes independently of the vehicle brakes.

10 Claims, 1 Drawing Figure

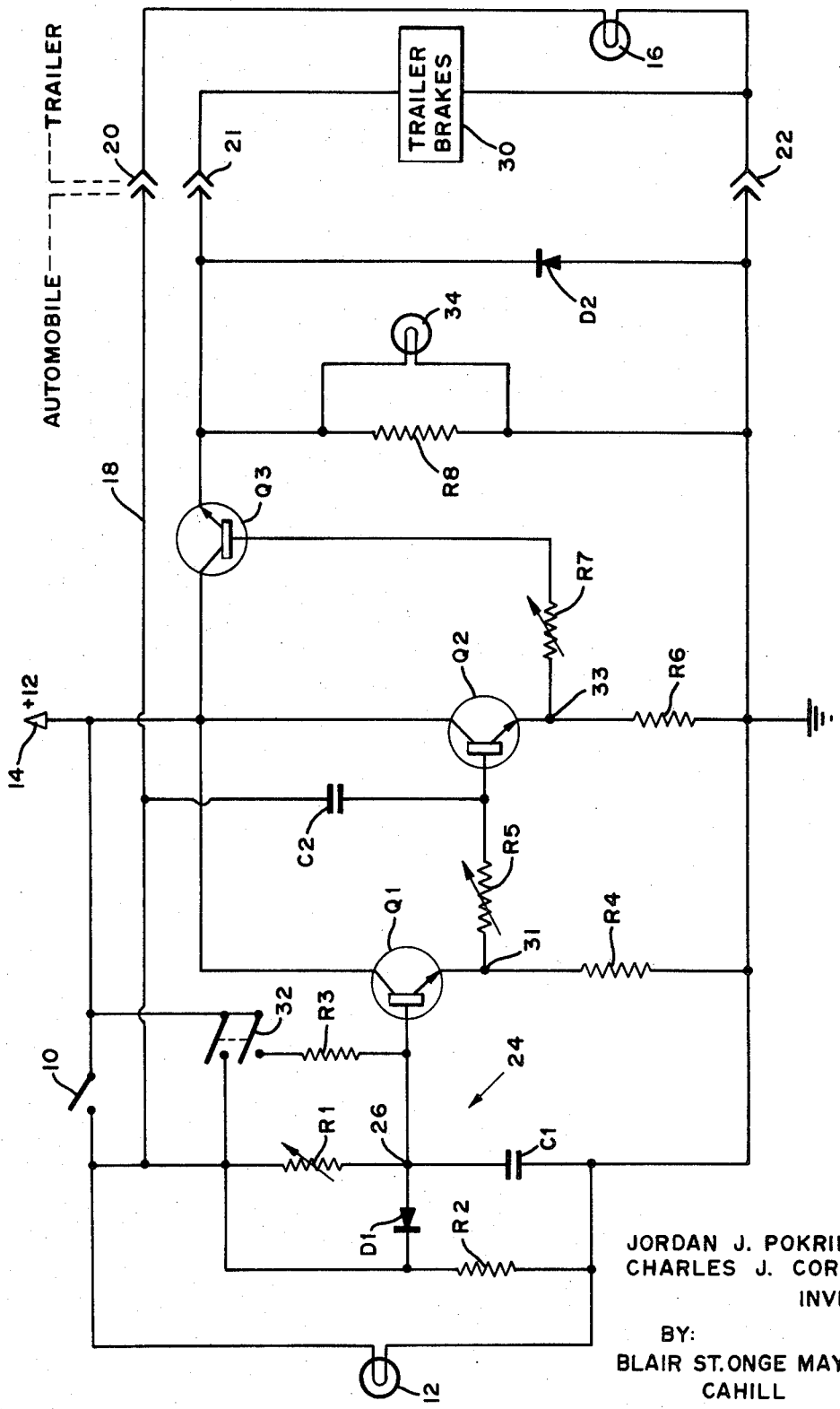

ELECTRONIC TRAILER BRAKE ACTUATOR

BACKGROUND OF THE INVENTION

At present, the most commonly used brake actuators for electric brakes used in recreational trailers such as house and camper trailers, are of the type which control trailer brake energization in response to the foot pressure on the towing vehicle brake pedal or the pressure of the hydraulic fluid in the towing vehicle brake system. The former approach typically involves applying a pressure sensing pad to the brake pedal which is compressed by the driver's foot incident to depressing the brake pedal. Unfortunately, the addition of such a pressure sensing pad adds to the height of the brake pedal, thus requiring compensating movement of the braking foot. Moreover, the brake pedal characteristics of different automobile makes and models vary considerably, and not all drivers brake with the same foot. Also different foot pressures are involved in actuating power brake systems versus regular brake systems. Consequently, trailer brake actuators of this type must be tailored not only to particular automobiles but also to particular drivers.

The other approach of sensing the hydraulic fluid pressure requires introducing a transducer at some point in the auto brake system, such as the master cylinder. This is an expensive proposition, requiring, as it does, several hours of labor by reasonably skilled mechanics. Also the opening of the brake system to introduce the transducer may void the manufacturer's warranty.

SUMMARY OF THE INVENTION

In accordance with the present invention, there is provided a trailer brake actuator which is readily adaptable to all of the various makes and models of automobiles and to the various types of brake systems with which the automobiles are equipped. Moreover, the trailer brake actuator of the present invention is readily adjustable in its operation to accommodate various numbers of trailer brake units, and thus the actuator is conveniently adapted to control the electrically actuated brakes in single, tandem and triple axle trailers with equal facility. In addition, the adaption of the instant trailer brake actuator to the towing automobile is achieved simply, at minimal expense, and yet operates automatically to energize the trailer brakes in response to actuation of the automobile braking system by the driver.

These objects and features of the invention are achieved simply and economically by deriving a trailer braking signal from the brake light circuit of the towing vehicle. Thus, the hookup of the instant trailer brake actuator involves simply effecting electrical connection into the automobile's brake light circuit.

More specifically, closure of the brake light switch is effective to supply energizing current to the automobile brake lights and coincidentally to supply current to a timing circuit which, in effect, meters the duration of each closure of the brake light switch. The metering output of this timing circuit is in the form of a control signal which is selectively amplified and used to control means for establishing the electrical energization level of the electric trailer brakes in accordance with the duration of closure of the brake light switch. Thus, for momentary closures of the brake light switch, the trailer brakes are not actuated. On the other hand, as the duration of a brake light switch closure increases, the control signal increases in magnitude to produce a corresponding increase in the magnitude of the energizing current supplied to the trailer brakes. Trailer braking thus increases up to a predetermined maximum value for prolonged brake light switch closures. Upon opening of the brake light switch, the control signal rapidly falls to a negligible level, thus terminating trailer brake energization.

Selective amplification of the control signal is provided so as to compensate, in terms of the effect of the control signal on the trailer brake energization level, for the number of braking units in a particular trailer and to adjust the trailer braking characteristics to suit a particular driver, as well as to compensate for trailer brake wear.

The trailer brake actuator of the present invention is further equipped with a switch which is adapted to by-pass the brake light switch and thus supply current from the brake light circuit to the timing circuit pursuant to achieving energization of the trailer brakes independently of the towing vehicle brakes. Preferably, this switch also is effective to alter certain parameters of the timing circuit such that trailer brake actuation is achieved more rapidly than in the automatic mode initiated in response to a brake light switch closure.

The trailer brake actuator of the present invention is simple in design and inexpensive to manufacture. Moreover, the actuator preferably uses solid state components, and thus is reliable, long lived, and compact in size. It can be mounted to the vehicle dashboard in convenient reach of the driver without restricting the driver's movements and comfort.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawing, in which the sole figure is a detailed circuit schematic of a trailer brake actuator constructed in accordance with a preferred embodiment of the invention.

DETAILED DESCRIPTION

Turning now to the drawing, reference numeral 10 represents the conventional brake light switch which, upon closure incident to depression of the automobile brake pedal, completes an energization circuit for brake light 12 from the plus terminal 14 of the car battery to ground. In addition, the brake light switch completes an energization circuit for the trailer brake lights 16 from the car battery via lead 18, connector 20 and connector 22 to ground.

It is also seen from the drawing that brake light switch 10 connects the car battery 14 to a timing circuit, generally indicated at 24 and included as the input section of the trailer brake actuator of the invention. Specifically, this timing circuit includes a resistor R1 and a capacitor C1 connected in series circuit between the brake light switch and ground. The junction 26 between resistor R1 and capacitor C1 is connected to ground through a switching diode D1 and a resistor R2. The cathode of diode D1 is also connected to the upper terminal of resistor R1.

From the description thusfar, it is seen that upon closure of the brake light switch, charging current from the battery is supplied through resistor R1 to the capacitor C1. It will be noted that diode D1 is back biased at this time and consequently does not divert charging current from capacitor C1. Depending upon the values of resistor R1 and capacitor C1, the voltage at junction 26 rises exponentially toward the battery voltage as the capacitor charges. Thus, the instantaneous amplitude of this voltage at junction 26 is actually a measure of the duration of closure of the brake light switch 10 and serves as an input signal to a two-stage amplifying network consisting of transistors Q1 and Q2.

When the brake light switch is opened, the back bias on switching diode D1 is removed, and it becomes conductive to provide a rapid discharge path for capacitor C1 through resistor R2 which has a resistance value substantially less than the resistance value of resistor R1. The signal voltage at junction 26 thus falls rapidly to essentially ground potential.

Optionally, resistor R1 may be made variable so as to adjustably alter the charging curve of capacitor C1 and thus the rate of rise of the signal voltage at junction 26. As will be seen, the rising amplitude of the voltage signal at junction 26 increases the energization of the electric trailer brakes 30 and thus controls the braking action of the trailer.

A double pole switch 32, which may be termed an emergency switch, has its movable contacts connected in common to the battery side of the brake light switch 10. One fixed terminal of switch 32 is connected to the upper terminal of variable resistor R1 which is also common to the cathode of switching diode D1. The other fixed contact of the emergency switch is connected to junction 26 through a resistor R3. The resistance of resistor R3 is preferably substantially less than that of resistor R1. It is seen that upon closure of emergency switch 32, the brake light switch 10 is effectively bypassed, and charging current is supplied to capacitor C1 through the parallel combination of resistors R1 and R3 with switching diode D1 back biased. Emergency switch 32 thus provides for a substantial reduction in the effective resistance in the charging path for capacitor C1 and thus a significantly more rapid rise in the signal voltage developed at junction 26. Emergency switch 32 thus initiates energization of the trailer brakes 30 independently of the automobile brakes and also more rapid trailer braking action than can be achieved automatically by closure of the brake light switch incident to actuation of the automobile brakes. Moreover, the emergency switch constitutes a failsafe feature which can be implemented in the event of a failure in the brake light switch 10.

As seen in the drawing, the signal voltage developed at junction 26 between resistor R1 and capacitor C1 is applied to the base of transistor Q1. This transistor may be an MPS3392 or its equivalent having a high input impedance. The collector of transistor Q1 is directly connected to the plus terminal 14 of the car battery, while its emitter is connected to ground through resistor R4. The junction 31 between the emitter of transistor Q1 and resistor R4 is connected through a resistor R5 to the base of transistor Q2, whose collector is connected directly to the plus battery terminal 14 and emitter is grounded through resistor R6. Transistor Q2 may be a 2N4921 or its equivalent. The junction 33 between the emitter of this transistor and resistor R6 is connected through a resistor R7 to the base of a power transistor Q3 whose collector-emitter circuit is connected via connectors 21 and 22 in series with the electromagnet actuating coils of the trailer brakes across the battery supply. The power transistor may be a 2N3055 or its equivalent, rated at 15 amps and 170 watts. A resistor R8 is connected from the emitter of transistor Q3 to ground to serve as a partial load and thus provides open circuit protection in the event of disconnection of connectors 21 and/or 22.

Optionally, a pilot lamp may be connected in parallel with resistor R8 or in lieu thereof to serve as the partial load for power transistor Q3. It will be noted from the drawing that pilot lamp 34 will light to indicate to the driver that energizing current for the trailer brakes 30 is being passed by power transistor Q3. In addition, a quenching diode D2 is connected in parallel with the partial load provided by resistor R8 and/or pilot lamp 34 and is poled so as to quench the back emf induced in the electromagnet coils upon termination of energizing current flow by power transistor Q3.

From the foregoing description, it is seen that as the signal voltage at junction 26 increases, the conductance of transistor Q1 increases correspondingly. The increasing voltage at the emitter of transistor Q1, as coupled through resistor R5, drives transistor Q2 farther into conduction. The voltage at the emitter of transistor Q2 rises toward the battery supply voltage, and, in so doing, increases the conductance of the collector-emitter circuit of power transistor Q3, thereby increasing the level of energization of the trailer brakes 30. Preferably, resistor R7 is a variable resistor to provide for fine adjustment of the relationship of the voltage signal amplitude at junction 26 to the conductance level of power transistor Q3 and thereby tailor the trailer braking action to the desires of a particular driver. Resistor R7 may also be used as an adjustment to compensate for worn trailer brakes.

In addition, interstage resistor R5 is preferably also variable to provide a course adjustment for the number of trailer axles or trailer brake units involved. It will be appreciated that as the number of trailer brake units increases, the conductance level of power transistor Q3 for a given signal voltage amplitude at junction 26 should increase substantially proportionately. For example, the nominal energization level for each trailer brake unit is approximately three to four amps for maximum trailer braking; a brake unit being considered as two brakes, one on each wheel of a single axle. Since plural trailer brake units are typically connected in parallel, a triple axle trailer employing three braking units requires a nominal conductance level of power transistor Q3 of approximately 10 amps for full actuation of the trailer brakes.

Optionally, a capacitor C2 may be connected between brake light switch 10 and the base of transistor Q2 for the purpose of adapting the actuator to worn trailer brakes. This capacitor acts immediately upon closure of the brake light switch to couple charging current through the base-emitter junction of transistor Q2, turning it on and thereby driving transistor Q3 into conduction. This operation produces an initial current surge through the trailer brakes 30, advancing the worn brake shoes into engagement with their respective brake drums. As capacitor C2 charges, this initial brake current surge begins to subside. However, capacitor C1 is also being charged at this time, and the signal voltage at junction 26 begins to take over the control of the conductance of transistor Q2 and sustain the trailer braking action.

It will be noted that the actuator of the invention has the collateral feature of discouraging the driver from riding the brake pedal. This is due to the fact that slight depression of the brake pedal may close the brake light switch to activate the trailer brakes with little or no actuation of the automobile brakes. Riding the brake pedal when no braking function is intended is not a good practice at any time, with or without a trailer, as it may cause undue brake wear.

If desired, the actuator may be additionally equipped with a lamp which is under the control of the dash light switch. This lamp would serve to guide the driver's hand in the dark, when it is intended to override the automatic operation of the trailer brake actuator by manual closure of switch 32.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

Having described our invention, what we claims as new and desire to secure by Letters Patent is:

1. A braking system for a tractor-trailer unit, said system comprising, in combination:
   A. a brake light circuit carried by the tractor, said circuit including a battery and a brake light and a brake light switch connected in series between first and second output terminals of said battery;
   B. electrical trailer brakes having a first input terminal and a second input terminal electrically connected to said second battery output terminal;
   C. a timing circuit connected across said first and second battery output terminals upon closure of said brake light switch for deriving a control signal proportional to the duration of brake light switch closure;
   D. electronic amplifier means connected to said timing circuit for selectively amplifying said control signal; and
   E. electronic control means connected between said first battery output terminal and said first trailer brake input terminal and responsive to said amplified control signal for regulating current flow to said trailer brakes in accordance with the duration of brake light switch closure.

2. The braking system defined in claim 1, wherein said timing circuit includes:
   1. a first resistor and a capacitor connected in series across said first and second battery terminals,
   2. said control signal being a signal voltage derived at a first junction of said first resistor and said capacitor.

3. The braking system defined in claim 2, wherein said first resistor is adjustable to vary the charging rate of said capacitor and thus the rate of increase of said signal voltage during the period of closure of said brake light switch.

4. The braking system defined in claim 2, which further includes a manual over-ride switch operable upon closure to by-pass said brake light switch and connect a second resistor in parallel with said first resistor, thereby to accelerate the charging rate of said capacitor and the rate of increase of said signal voltage.

5. The braking system defined in claim 4, which further includes a diode connected between said first junction and a second junction connectable to said first battery terminal through either said brake light switch or said manual over-ride switch and to said second battery terminal through a third resistor, said diode being back-biased during closure of either said brake light switch or said manual over-ride switch and unbiased upon opening of the previously closed switch to rapidly discharge said capacitor.

6. The braking system defined in claim 5, wherein
   1. said amplifier means comprises a two stage transistor amplifier network, and
   2. said control means comprises a power transistor having its base connected to the output of said amplifier network and its collector-emitter circuit connected in the circuit between said first battery terminal and said first trailer brake input terminal.

7. The braking system defined in claim 6, wherein said amplifier network further includes a variable interstage resistor for adjusting the relationship between the amplitude of said signal voltage and the conductance level of said power transistor.

8. The braking system defined in claim 6, which further includes a variable resistor connected in the base circuit of said power transistor for adjusting the relationship between the amplitude of said signal voltage and the conductance level of said power transistor.

9. The braking system defined in claim 6, which further includes a second capacitor connected between said brake light switch and the base input circuit of the output transistor of said amplifier network, said second capacitor serving to anticipate the controlling effect of said signal voltage by causing said power transistor to pass an initial current surge and thereby to compensate for worn trailer brakes.

10. The braking system defined in claim 6, which further includes a pilot lamp and a quenching diode connected across said trailer brake input terminals.

* * * * *